(12) United States Patent
Morino et al.

(10) Patent No.: US 11,243,341 B2
(45) Date of Patent: Feb. 8, 2022

(54) MANUFACTURING METHOD OF LIGHT GUIDE PLATE, LIGHT GUIDE PLATE, BACKLIGHT UNIT, AND LIQUID CRYSTAL DISPLAY DEVICE

(71) Applicant: SHARP KABUSHIKI KAISHA, Sakai (JP)

(72) Inventors: Shinya Morino, Sakai (JP); Tahei Nakaue, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 316 days.

(21) Appl. No.: 16/698,745

(22) Filed: Nov. 27, 2019

(65) Prior Publication Data

US 2020/0174175 A1 Jun. 4, 2020

Related U.S. Application Data

(60) Provisional application No. 62/773,809, filed on Nov. 30, 2018.

(51) Int. Cl.
*F21V 8/00* (2006.01)
*B29D 11/00* (2006.01)
*B29K 669/00* (2006.01)

(52) U.S. Cl.
CPC ...... *G02B 6/0043* (2013.01); *B29D 11/00663* (2013.01); *G02B 6/0065* (2013.01); *B29K 2669/00* (2013.01)

(58) Field of Classification Search
CPC ............... G02B 6/0043; G02B 6/0065; B29D 11/00798; B29D 11/00663
See application file for complete search history.

(56) References Cited

FOREIGN PATENT DOCUMENTS

| JP | 2013-137392 A | 7/2013 |
| JP | 2016-149193 A | 8/2016 |
| JP | 2017050277 A * | 3/2017 |

* cited by examiner

*Primary Examiner* — Karabi Guharay
(74) *Attorney, Agent, or Firm* — ScienBiziP, P.C.

(57) ABSTRACT

The present invention provides a method for producing a light guide plate including a light-diffusing surface. The method includes (1) applying a protonic polar solvent to a surface of a polycarbonate substrate, and (2) heating the polycarbonate substrate in a water-containing environment to cause precipitation of bisphenol A particles each having a particle size of 10 μm or smaller on the surface of the polycarbonate substrate.

6 Claims, 4 Drawing Sheets

50μm

20μm

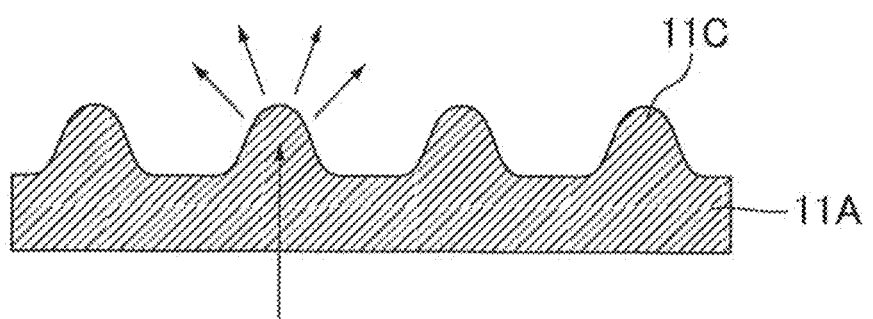
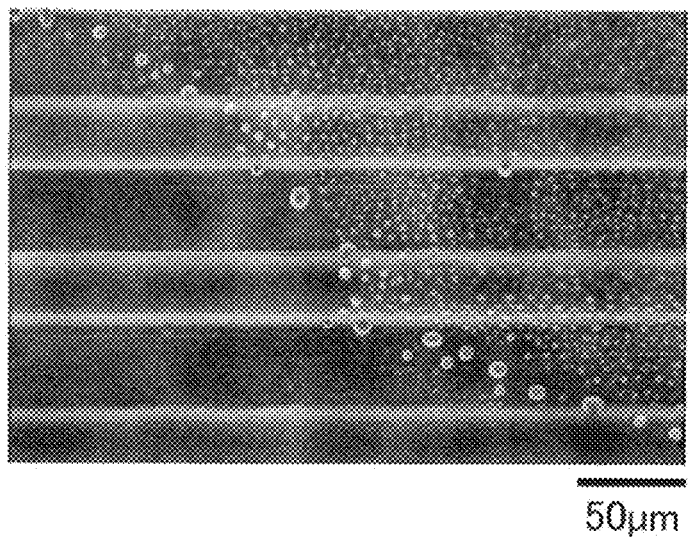

MANUFACTURING METHOD OF LIGHT GUIDE PLATE, LIGHT GUIDE PLATE, BACKLIGHT UNIT, AND LIQUID CRYSTAL DISPLAY DEVICE

CROSS-REFERENCE TO RELATED APPLICATIONS

The present application claims priority under 35 U.S.C. § 119 to U.S. Provisional Application No. 62/773,809 filed on Nov. 30, 2018, the contents of which are incorporated herein by reference in their entirety.

BACKGROUND OF THE INVENTION

Field of the Invention

The present invention relates to methods for producing light guide plates, light guide plates, backlight units, and liquid crystal display devices.

Description of Related Art

Liquid crystal display devices are widely used as display modules for mobile devices. Liquid crystal display devices are non-self-luminous display devices and are therefore commonly provided with a surface light source device (backlight unit) on the back side of a liquid crystal panel. A widely used backlight unit type is an edge-lit type utilizing a light guide plate. The light guide plate in a backlight unit is configured to repetitively reflect light incident on its surface from a side surface to guide the reflected light to the whole inside thereof, uniformly emitting light to the liquid crystal panel from the entire light-emitting surface facing the liquid crystal panel. The backlight unit commonly includes not only the light guide plate but also a diffusing film (diffuser) in order to satisfy the desired display performance, for example.

Various types of light guide plates for backlight units are proposed, and known light guide plates include those having an uneven structure on a surface thereof. For example, JP 2013-137392 A discloses a light guide plate including protrusions on a reflection surface so as to allow the light guide plate to provide an additional function as a lenticular lens, the protrusions being formed using a press roll.

Known light guide plates also include those utilized in the fields of sign boards with letters or figures and of displays of signals. With regard to such light guide plates utilized in these fields, JP 2016-149193 A discloses one having an uneven configuration on a surface to enable display based on scattered transmitted light. Specifically, disclosed therein is a transparent plastic resin having on a surface an uneven configuration that is formed by erosion of a solvent with pigments of printing ink uniformly dispersed therein and that can generate scattered transmitted light.

BRIEF SUMMARY OF THE INVENTION

Thinner display modules to be integrated into mobile devices are always awaited and they are also desired to have good display performance factors such as high luminance, luminance uniformity, high definition, and wide viewing angle (low viewing angle dependency). This accordingly causes a demand for thinner backlight units.

To reduce the number of components of a backlight unit is effective in achieving not only a thin profile but also a high luminance because such reduction can reduce light absorption by the components and reflection on the interfaces between the components and the air. Specifically, a possible method for reducing the number of components is to form a fine uneven structure on a surface of a light guide plate, which is a main component of a backlight unit, and to make it function as a diffuser, thereby achieving a backlight unit having a structure without a diffuser. However, factors such as poor processing moldability, difficulty in producing a mold, and high process cost make it almost impossible from the practical viewpoint to form, on a surface of a light guide plate, a fine uneven structure that can ensure the other display quality factors such as luminance uniformity.

For example, JP 2013-137392 A discloses formation of protrusions using a press roll. Still, a molding process can only provide protrusions whose smallest size is several tens of micrometers. Accordingly, to form an uneven structure having a size of several micrometers on the entire surface is almost impossible from the technical and cost viewpoints.

JP 2016-149193 A discloses formation of an uneven structure on a surface of a substrate by erosion of a solvent with pigments of printing ink uniformly dispersed therein. Still, the literature fails to disclose any specific conditions for forming a fine uneven structure having a high light-diffusing effect enough for a light guide plate of a backlight unit.

In response to the above issues, the present invention aims to provide a method for producing a light guide plate capable of efficiently providing a light guide plate exhibiting excellent light-diffusing performance, a light guide plate having a structure obtainable by the production method, a backlight unit, and a liquid crystal display device.

BRIEF SUMMARY OF THE INVENTION (1) An embodiment of the present invention is a method for producing a light guide plate having a light-diffusing surface, the method successively including: (1) applying a protonic polar solvent to a surface of a polycarbonate substrate; and (2) heating the polycarbonate substrate in a water-containing environment to cause precipitation of bisphenol A particles each having a particle size of 10 μm or smaller on the surface of the polycarbonate substrate.

(2) In an embodiment of the present invention, the method for producing a light guide plate includes the structure (1) and the protonic polar solvent contains an alcohol.

(3) In an embodiment of the present invention, the method for producing a light guide plate includes the structure (1) and the protonic polar solvent contains an alcohol with polyester dissolved therein.

(4) Another embodiment of the present invention is a light guide plate including a light-diffusing surface, the light-diffusing surface including a surface of a polycarbonate substrate and bisphenol A particles each having a particle size of 10 μm or smaller dispersed on the surface of the polycarbonate substrate.

(5) Another embodiment of the present invention is a backlight unit including the light guide plate having the above structure (4).

(6) Another embodiment of the present invention is a liquid crystal display device including the backlight unit having the above structure (5) and a liquid crystal panel.

The present invention can provide a method for producing a light guide plate capable of efficiently providing a light guide plate exhibiting excellent light-diffusing performance, a light guide plate having a structure obtainable by the production method, a backlight unit, and a liquid crystal display device.

BRIEF DESCRIPTION OF THE DRAWINGS

FIG. 5B is a diagram illustrating light diffusion by a conventional uneven structure.

FIG. 6 is a micrograph of the surface of a polycarbonate substrate with bisphenol A particles precipitated thereon in Experimental Example 2.

DETAILED DESCRIPTION OF THE INVENTION

Figure 1:
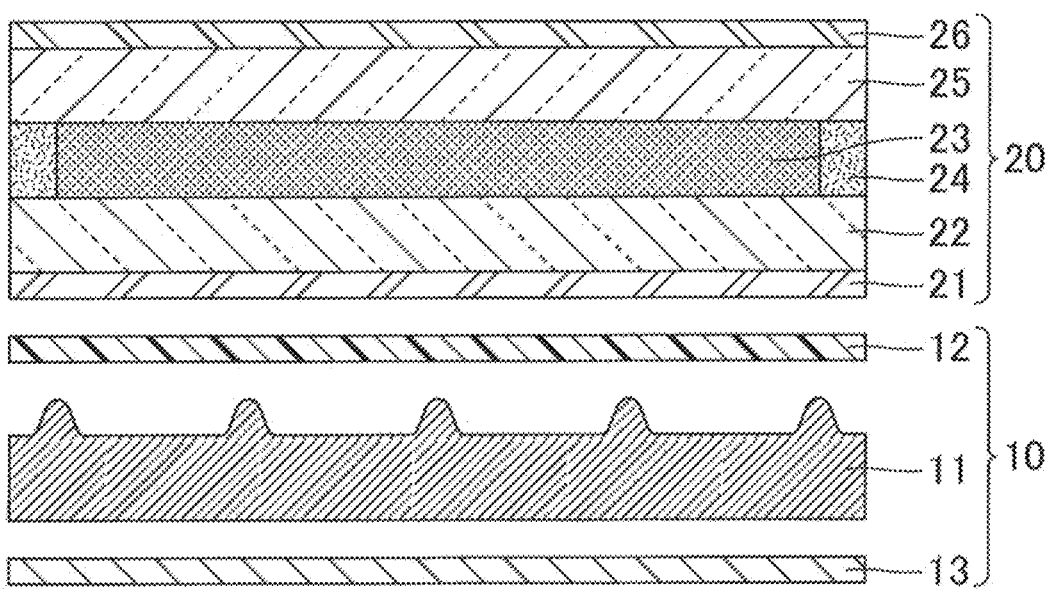
FIG. 1 is a schematic cross-sectional view of a structure of a liquid crystal display device in an embodiment.

Hereinafter, an embodiment of the present invention is described. The present invention is not limited to the contents disclosed in the following embodiment, and the design thereof may be changed as appropriate within the spirit of the present invention.

<Method for Producing Light Guide Plate>

The method for producing a light guide plate in the present embodiment is to provide a light guide plate having a light-diffusing surface. A conventional backlight unit includes a diffuser having a function of diffusing light to equalize the amount of light in addition to a light guide plate. In contrast, a light guide plate having a light-diffusing surface can have the above function of a diffuser, which can eliminate the presence of a diffuser. To eliminate a diffuser can reduce the number of components of a backlight unit, which is advantageous to achieve a thin profile. Further, to eliminate a diffuser prevents light absorption by a diffuser and reflection on the interface between a diffuser and the air, which is advantageous to increase the luminance in terms of optical theory. To eliminate a diffuser also prevents defects caused by a diffuser and prevents issues relating to the reliability of a diffuser such as flexure.

Some conventional light guide plates have a surface provided with protrusions for uniformly spreading the light from a light source such as LED, but they fail to have a light-diffusing function that can be achieved by a diffuser. In order to achieve a light-diffusing function that can be achieved by a diffuser, an uneven structure needs to have a size of several micrometers that is finer than conventional ones. Common light guide plates are formed using a mold. Still, a molding process can only provide protrusions whose smallest size is several tens of micrometers. Accordingly, to form an uneven structure having a size of several micrometers on the entire surface is almost impossible from the technical and cost viewpoints.

Then, in the present embodiment, a precipitation phenomenon is utilized which occurs when a protonic polar solvent such as an alcohol is made to act on a polycarbonate substrate, which is to constitute a light guide plate, in a predetermined environment. When exposed to a high-temperature high-humidity environment in the presence of a trace of alcohol, for example, the polycarbonate substrate is hydrolyzed and particles mainly containing bisphenol A precipitate on a surface. This precipitation phenomenon enables uniform formation of fine transparent particles each having a particle size of 10 µm or smaller on a surface of a substrate.

The method for producing a light guide plate in the present embodiment includes (1) applying a protonic polar solvent to a surface of a polycarbonate substrate. A common material of the light guide plate is polycarbonate from the viewpoints of transparency, moldability, and cost. The density (roughness and fineness) of particles generated by the precipitation phenomenon can be controlled by adjusting the condition (wettability) of the surface of the polycarbonate substrate. Specifically, the protonic polar solvent preferably wets and spreads on the surface of the polycarbonate substrate. The higher the wettability is, the denser the particles generated are.

The protonic polar solvent is a solvent containing hydrogen atoms binding to oxygen (to form a hydroxy group) or nitrogen (to form an amine). Examples of the protonic polar solvent include alcohols such as ethanol and ammonia-containing water (ammonia water). Preferred are alcohols. The protonic polar solvent is also preferably a protonic polar solvent with polyester dissolved therein. For example, an alcohol with polyester dissolved therein can suitably be used. The polyester is preferably polyethylene terephthalate (PET). Even a very small amount of polyester dissolved (i.e., a very low concentration of polyester) has an effect of increasing the density of particles generated. The concentration thereof may be 1000 ppm or less, for example.

The protonic polar solvent may be applied by any technique. Preferably, the protonic polar solvent is applied only to the surface to be a light-diffusing surface. A trace of the protonic polar solvent is enough to precipitate particles. For example, particles can precipitate even with a trace of alcohol remaining on the surface of the polycarbonate substrate after wiping the surface of the substrate with a cloth impregnated with alcohol and then drying the alcohol.

After the above application (1), the method for producing a light guide plate in the present embodiment includes (2) heating the polycarbonate substrate in a water-containing environment to cause precipitation of bisphenol A particles each having a particle size of 10 µm or smaller on the surface of the polycarbonate substrate. When exposed to a high-temperature high-humidity environment (e.g., 60° C. and 90% RH) in the presence of a trace of a protonic polar solvent, the polycarbonate substrate is hydrolyzed and particles mainly containing bisphenol A precipitate on the surface. These particles are generated in a relatively dispersed manner, and each particle has a particle size of 10 µm or smaller. Thus, even when the region with particles precipitated thereon is visually observed, the particles cannot be confirmed. When light is applied from a side surface of the light guide plate, the surface can diffuse the light. As described, to cause precipitation of bisphenol A particles each having a particle size of 10 µm or smaller on the surface of the polycarbonate substrate can lead to a light-diffusing surface exhibiting a high light-diffusing effect.

<Light Guide Plate>

The light guide plate in the present embodiment is a light guide plate having a light-diffusing surface, the light-diffusing surface including a surface of a polycarbonate substrate and bisphenol A particles each having a particle size of 10 µm or smaller dispersed on the surface of the polycarbonate substrate. The light guide plate having such a structure in the present embodiment can be produced by the aforementioned method for producing a light guide plate and can exhibit a high light-diffusing effect because the light-diffusing surface includes the surface of the polycarbonate substrate and the bisphenol A particles each having a particle size of 10 µm or smaller dispersed on the surface of the polycarbonate substrate.

<Backlight Unit and Liquid Crystal Display Device>

Figure 2:
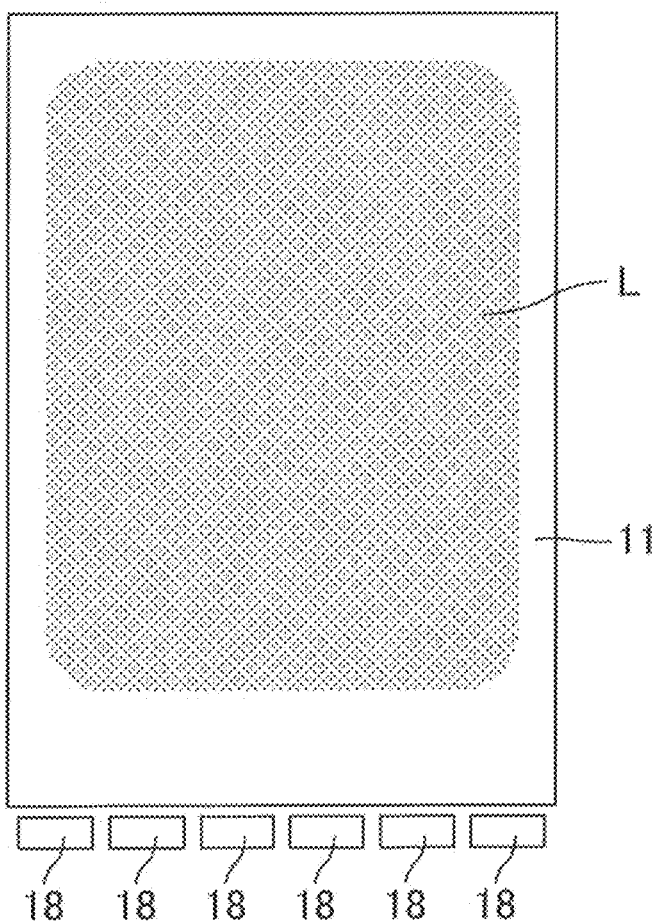
FIG. 2 is a schematic plan view of an arrangement of a light guide plate and light sources of a backlight unit in an embodiment.

With reference to FIGS. 1 and 2, structures of a backlight unit and a liquid crystal display device including the light guide plate in the present embodiment are described. FIG. 1 is a schematic cross-sectional view of a structure of the liquid crystal display device in the present embodiment. FIG. 2 is a schematic plan view of an arrangement of a light guide plate and light sources of the backlight unit in the present embodiment.

A backlight unit 10 in the present embodiment may be any backlight unit that is a surface light source device including a light guide plate 11, and preferably includes no diffuser. Examples of components other than the light guide plate 11 in the backlight unit 10 include optical sheets such as a lens sheet 12 and a reflection sheet 13, and light sources 18 such as light emitting diodes (LEDs) or cold cathode fluorescent lamps (CCFLs). An exemplary structure of the backlight unit 10 may be such that emitters of the respective light sources 18 face a side surface of the light guide plate 11 and the optical sheets overlap the light guide plate. In this case, the light emitted from each light source 18 enters the light guide plate 11 from the side surface of the light guide plate 11 and travels toward the opposite side surface of the light guide plate 11, while the light is partially reflected on the back surface of the light guide plate 11 and is thereby attenuated. The light part reflected on the back surface of the light guide plate 11 exits from the front surface (light-diffusing surface), providing planar light emission L. The optical sheets each have a function of controlling the characteristics of light exiting from the front surface of the light guide plate or of reflecting the light passed through the back surface of the light guide plate and returning the reflected light to the light guide plate side.

The liquid crystal display device in the present embodiment may be any liquid crystal display device including the backlight unit 10 and a liquid crystal panel 20. The liquid crystal panel 20 may be any liquid crystal panel commonly used in the field of liquid crystal display devices. An exemplary structure of the liquid crystal panel 20 may be such that a polarizer 21, a TFT substrate 22, a liquid crystal layer 23 containing liquid crystal molecules, a CF substrate 25, and a polarizer 26 are stacked in the stated order. The liquid crystal layer 23 is sealed by a sealing material 24 that attaches the TFT substrate 22 and the CF substrate 25. The backlight unit 10 is disposed on the back side of the liquid crystal panel 20. The amount of light to pass through the liquid crystal panel 20 after emitted from the backlight unit 10 is controlled by a voltage applied to the liquid crystal layer 23 in the liquid crystal panel 20.

Figure 3A:
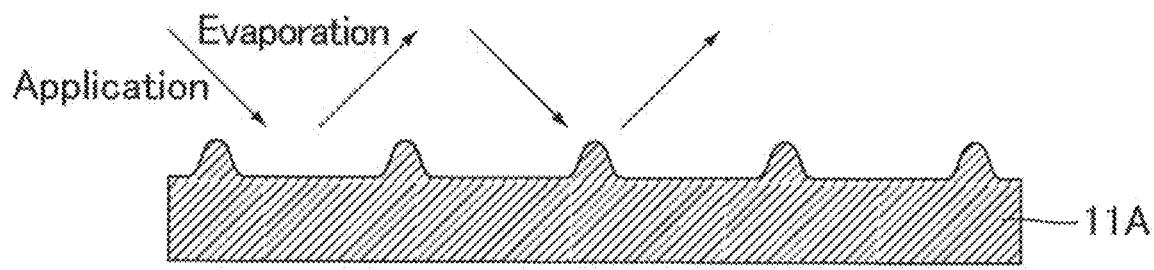
FIG. 3A is a diagram illustrating application of an alcohol to a surface of a polycarbonate substrate.
Figure 3B:
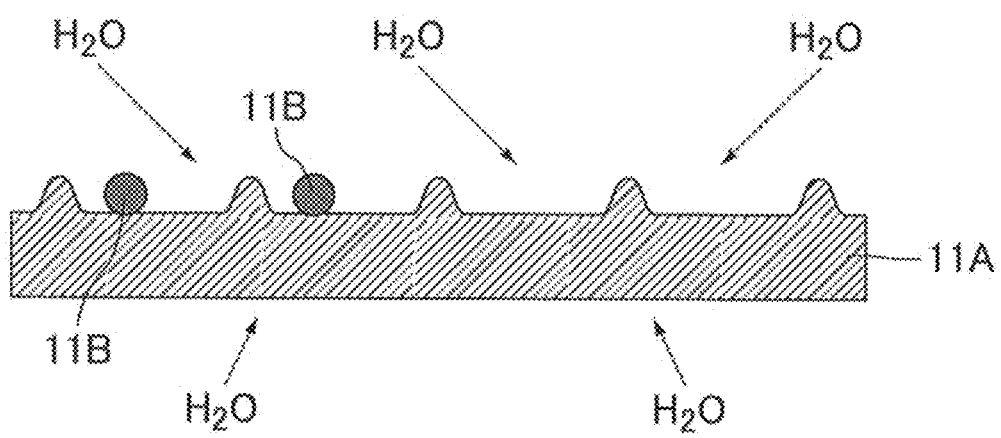
FIG. 3B is a diagram illustrating exposure of the polycarbonate substrate to a high-temperature high-humidity environment to cause precipitation of bisphenol A particles on the surface of the polycarbonate substrate.

With reference to the drawings, specific examples are described hereinbelow in each of which a light guide plate having a light-diffusing surface was actually produced by the method for producing a light guide plate in the present embodiment. FIG. 3A is a diagram illustrating application of an alcohol to a surface of a polycarbonate substrate. FIG. 3B is a diagram illustrating exposure of the polycarbonate substrate to a high-temperature high-humidity environment to cause precipitation of bisphenol A particles on the surface of the polycarbonate substrate.

Experimental Example 1

A polycarbonate substrate 11A prepared was IUPILON (grade: HL-8002 N413) available from Mitsubishi Engineering-Plastics Corp. which is widely used as a light guide plate of a backlight unit. As illustrated in FIG. 3A, anhydrous ethanol (hereinafter, simply referred to as an "alcohol") was applied to part of a surface of the polycarbonate substrate 11A and was immediately dried, whereby the alcohol was evaporated into the atmosphere. Thus, no mark remained on the surface of the substrate and no reaction occurred in this state. The alcohol may be applied to any region where the light-diffusing surface is to be formed. In the present experimental example, the alcohol was applied to only a part of the surface of the polycarbonate substrate 11A so as to compare the region where the alcohol was applied and the region where no alcohol was applied.

Figure 4A:
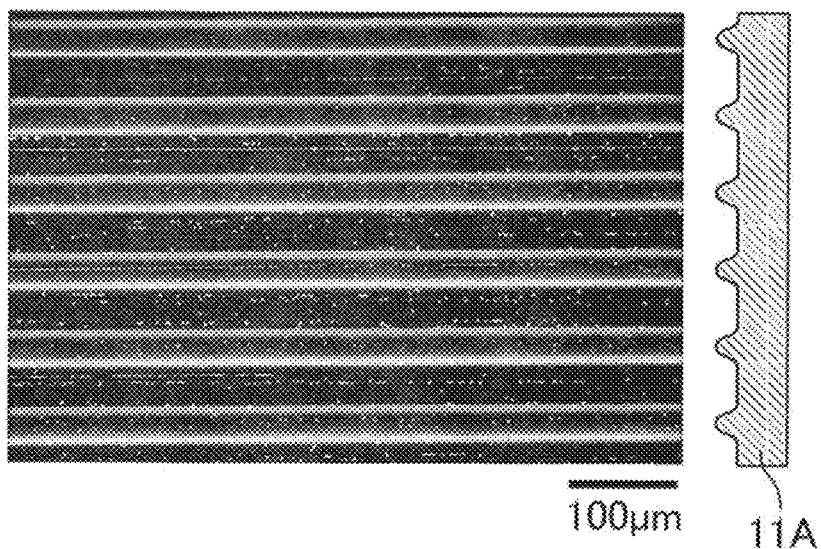
FIG. 4A is a micrograph of the surface of a polycarbonate substrate with the bisphenol A particles precipitated thereon in Experimental Example 1.
Figure 4B:
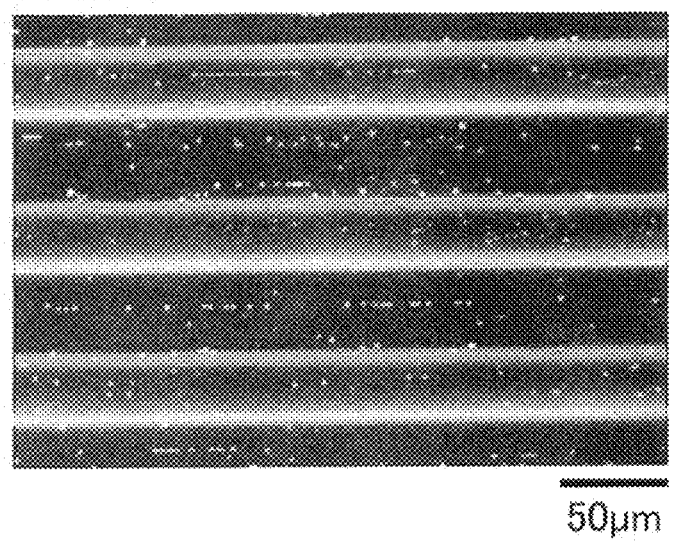
FIG. 4B is an enlarged micrograph of FIG. 4A.
Figure 4C:
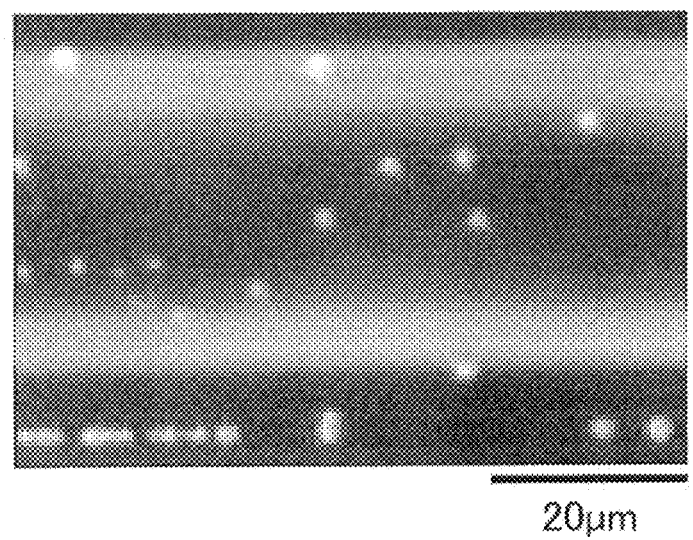
FIG. 4C is an enlarged micrograph of FIG. 4B.

Then, as illustrated in FIG. 3B, the polycarbonate substrate 11A was placed in a high-temperature high-humidity environment at 60° C. and 90% RH for 12 hours. Thereby, a trace of the alcohol remaining on the surface of the polycarbonate substrate 11A and the water contained in the environment acted on the polycarbonate in the polycarbonate substrate 11A, resulting in precipitation of bisphenol A particles 11B on the polycarbonate substrate 11A in the region where the alcohol was applied. FIG. 4A is a micrograph of the surface of the polycarbonate substrate with the bisphenol A particles precipitated thereon in Experimental Example 1. FIG. 4B is an enlarged micrograph of FIG. 4A. FIG. 4C is an enlarged micrograph of FIG. 4B. Horizontal stripes each having a width of 30 µm in FIG. 4A correspond to protrusions formed on the surface of the polycarbonate substrate 11A in a molding process. Very fine white dots arranged over the entire surface of FIG. 4A correspond to the bisphenol A particles 11B. The precipitated bisphenol A particles 11B each had a transparent, almost spherical particulate structure and was very small (has a particle size of 3 µm or smaller). The precipitated bisphenol A particles 11B were uniformly dispersed on the entire region where the alcohol was applied.

Figure 5A:
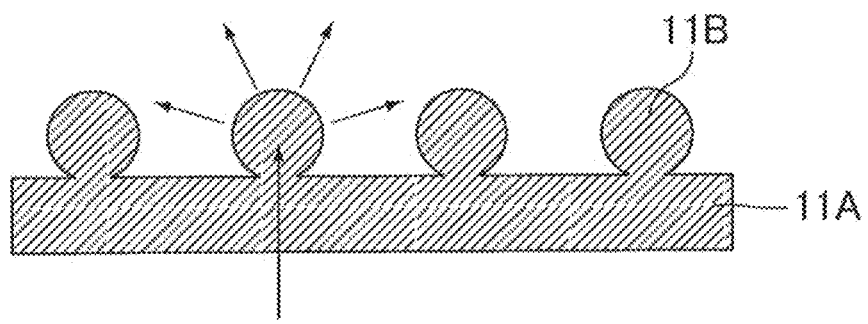
FIG. 5A is a diagram illustrating light diffusion by bisphenol A particles.

When the polycarbonate substrate 11A with the bisphenol A particles 11B precipitated thereon was used as a light guide plate, the region with the alcohol applied thereto and with the bisphenol A particles 11B precipitated thereon had a much higher light-diffusing effect and seemed to be brighter than the region with no alcohol applied thereto. FIG. 5A is a diagram illustrating light diffusion by bisphenol A particles. FIG. 5B is a diagram illustrating light diffusion by a conventional uneven structure. As illustrated in FIG. 5A, the precipitated bisphenol A particles 11B each have an almost spherical shape in microscopic observation. As is clear from comparison between FIG. 5A and FIG. 5B, the bisphenol A particles 11B each having an almost spherical shape illustrated in FIG. 5A can refract the incident light in more directions at greater angles than an uneven structure 11C having a waveform illustrated in FIG. 5B. This can presumably lead to a higher light-diffusing effect.

In the present experimental example, only alcohols that remained in a trace amount on the surface of the polycarbonate substrate contributed to the hydrolysis reaction. In other words, only a trace of alcohol is enough for the hydrolysis, and an excessive amount of the alcohol was evaporated and did not remain on the surface of the substrate. The reason why a trace of alcohol remained is that the surface of the polycarbonate substrate has micro voids and dangling bonds and only the alcohol molecules binding thereto remain. The alcohol in this state causes the hydrolysis reaction. Accordingly, the precipitated bisphenol A particles each have a small size.

According to the method of the present experimental example, an excessive amount of the alcohol is evaporated. This can eliminate the need for strict control of the amount of alcohol applied in the plane, enabling uniform application of an appropriate amount of alcohol to the surface of the polycarbonate substrate. This ensures the uniformity of the amount of the bisphenol A particles generated on the surface of the polycarbonate substrate. Further, this resultantly ensures the uniformity of the light-diffusing performance of the surface of the light guide plate. Thereby, the light guide plate can provide uniform brightness.

An alcohol easily available is one having high purity. Applying such an alcohol to the surface by an appropriate technique can cause a hydrolysis reaction without impairing the cleanliness of the light guide plate.

Experimental Example 2

The same process as in Experimental Example 1 was performed, except that a trace of polyethylene terephthalate (PET) was dissolved in the anhydrous ethanol to be applied to the polycarbonate substrate. FIG. 6 is a micrograph of the surface of a polycarbonate substrate with bisphenol A particles precipitated thereon in Experimental Example 2. The magnification thereof is the same as in FIG. 4B. The upper right of the diagonal line in FIG. 6 is a region where the anhydrous ethanol with a trace of PET dissolved therein was applied, while the lower left thereof is a region without the treatment. In the upper right of the diagonal line in FIG. 6, bisphenol A particles were generated in a high density on the surface of the polycarbonate substrate. Comparison between FIG. 4B and FIG. 6 shows that the density of the bisphenol A particles in Experimental Example 2 is significantly higher than that in Experimental Example 1.

The method for producing a light guide plate of the present embodiment is common to JP 2016-149193 A in that the substrate is subjected to a surface treatment using a solvent for giving a diffusing function to a surface of the light guide plate. Still, the method of forming an uneven structure is precipitation of fine particles in the present embodiment while it is etching (erosion) of the substrate in JP 2016-149193 A. Accordingly, in the present embodiment, a finer uneven structure can be formed than in JP 2016-149193 A. Further, the method in JP 2016-149193 A is etching and thus requires removal of a mask after the etching. On the contrary, no such a step is performed in the present embodiment.

What is claimed is:

1. A method for producing a light guide plate having a light-diffusing surface, the method successively comprising:
   (1) applying a protonic polar solvent to a surface of a polycarbonate substrate; and
   (2) heating the polycarbonate substrate in a water-containing environment to cause precipitation of bisphenol A particles each having a particle size of 10 μm or smaller on the surface of the polycarbonate substrate.

2. The method for producing a light guide plate according to claim 1,
   wherein the protonic polar solvent contains an alcohol.

3. The method for producing a light guide plate according to claim 1,
   wherein the protonic polar solvent contains an alcohol with polyester dissolved therein.

4. A light guide plate comprising a light-diffusing surface, the light-diffusing surface including a surface of a polycarbonate substrate and bisphenol A particles each having a particle size of 10 μm or smaller dispersed on the surface of the polycarbonate substrate.

5. A backlight unit comprising the light guide plate according to claim 4.

6. A liquid crystal display device comprising the backlight unit according to claim 5 and a liquid crystal panel.

* * * * *